(12) United States Patent
Wang et al.

(10) Patent No.: US 11,280,537 B2
(45) Date of Patent: Mar. 22, 2022

(54) REFRIGERATING AND FREEZING DEVICE

(71) Applicant: QINGDAO HAIER JOINT STOCK CO., LTD., Qingdao (CN)

(72) Inventors: Lei Wang, Qingdao (CN); Bo Jiang, Qingdao (CN); Hao Zhang, Qingdao (CN); Jing Wang, Qingdao (CN); Guoshun He, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 375 days.

(21) Appl. No.: 16/468,278

(22) PCT Filed: Dec. 8, 2017

(86) PCT No.: PCT/CN2017/115124
§ 371 (c)(1),
(2) Date: Jun. 10, 2019

(87) PCT Pub. No.: WO2018/103720
PCT Pub. Date: Jun. 14, 2018

(65) Prior Publication Data
US 2020/0072529 A1    Mar. 5, 2020

(30) Foreign Application Priority Data

Dec. 9, 2016  (CN) .......................... 201611132067.6

(51) Int. Cl.
*F25D 17/04*  (2006.01)
*A23L 3/3418*  (2006.01)
(Continued)

(52) U.S. Cl.
CPC .......... *F25D 17/042* (2013.01); *A23L 3/3418* (2013.01); *B01D 53/228* (2013.01);
(Continued)

(58) Field of Classification Search
CPC ...... F25D 17/042; F25D 17/06; F25D 17/062; F25D 11/02; F25D 25/025; F25D 25/02;
(Continued)

(56) References Cited

FOREIGN PATENT DOCUMENTS

| CN | 2697545 Y | 5/2005 |
|----|-----------|--------|
| CN | 201199115 Y * | 2/2009 |

(Continued)

*Primary Examiner* — Emmanuel E Duke
(74) *Attorney, Agent, or Firm* — Cheng-Ju Chiang

(57) ABSTRACT

A refrigerating and freezing device comprises a box body, a modified atmosphere film assembly and a suction pump. The box body has an inner container, a casing and a heat insulation layer; the inner container is internally provided with a storage space; the modified atmosphere film assembly is configured in such a way that more oxygen, relative to nitrogen, of a gas flow in a space around the modified atmosphere film assembly penetrates a modified atmosphere film and enters a rich-oxygen gas collecting cavity; and the suction pump is provided in the heat insulation layer, and an inlet end of the air extracting pump, through a pipeline, is in communication with the oxygen-rich gas collecting cavity of the modified atmosphere film assembly to pump and discharge the gas penetrated into the oxygen-rich gas collecting cavity out of a storage container.

6 Claims, 4 Drawing Sheets

(51) Int. Cl.
*B01D 53/22* (2006.01)
*C01B 13/02* (2006.01)
*F25D 11/02* (2006.01)
*F25D 17/06* (2006.01)
*F25D 25/02* (2006.01)

(52) U.S. Cl.
CPC .......... *C01B 13/0251* (2013.01); *F25D 11/02* (2013.01); *F25D 17/06* (2013.01); *F25D 25/025* (2013.01); *A23V 2002/00* (2013.01); *C01B 2210/001* (2013.01); *F25D 2317/04* (2013.01); *F25D 2317/061* (2013.01)

(58) Field of Classification Search
CPC ........... F25D 2317/04; F25D 2317/061; A23L 3/3418; B01D 53/228; B01D 2256/10; B01D 2257/104; B01D 2259/4525; B01D 53/22; C01B 13/0251; C01B 2210/001; A23V 2002/00
See application file for complete search history.

(56) References Cited

FOREIGN PATENT DOCUMENTS

| CN | 201199115 Y | 2/2009 | |
|---|---|---|---|
| CN | 101766321 A | 7/2010 | |
| CN | 106546053 A | 3/2017 | |
| CN | 206449966 U | 8/2017 | |
| JP | 2004-360948 A | 12/2004 | |
| JP | 2004360948 A * | 12/2004 | ........... F25D 17/042 |

\* cited by examiner

REFRIGERATING AND FREEZING DEVICE

CROSS-REFERENCE TO RELATED APPLICATION

The present application is a 35 U.S.C. § 371 National Phase conversion of International (PCT) Patent Application No. PCT/CN2017/115124, filed on Dec. 8, 2017, which claims priority of Chinese Patent Application No. 201611132067.6, filed on Dec. 9, 2016 and titled "Refrigerating and Freezing Device", which is incorporated herein by reference in its entirety. The PCT International Patent Application was filed and published in Chinese.

TECHNICAL FIELD

The present invention relates to the technical field of article storage by a refrigerator, and more particularly, to a refrigerating and freezing device.

BACKGROUND

The refrigerator is a refrigerating device that maintains a constant low temperature, and is also a civilian product that keeps food or other articles at a constant-low-temperature cold state. With the improvement of life quality, consumers demand more and more on freshness keeping of stored food, especially, the color, taste and the like of the food. Therefore, it should be ensured that the color, taste, freshness and the like of the stored food are unchanged as much as possible during storage. At present, there is only vacuum freshness keeping on the market for better storing the food. The vacuum freshness keeping manners often used are freshness keeping with a vacuum bag and freshness keeping with a vacuum storage compartment.

If the vacuum bag is adopted for freshness keeping, the consumers need to carry out the vacuumizing action every time the food is stored, which is troublesome in operation and cannot be enjoyed by the consumers.

If the vacuum storage compartment is adopted for freshness keeping, since a refrigerator body and the like are of rigid structures, in order to maintain the vacuum state, the requirements on a vacuumizing system and the sealing performance of the refrigerator are very high. When an article is taken or placed every time, a large quantity of new air is poured in, and thus the consumption of energy is relatively high. Moreover, in a vacuum environment, it is relatively difficult for the food to receive cold, which is particularly unfavorable for food storage. In addition, due to the vacuum environment, it takes a lot of effort for the user to open a refrigerator door every time, thereby causing inconvenience to the user. Although the vacuum storage compartments of some refrigerators can be ventilated by vacuumizing systems, the user needs to wait for a longer time, resulting in poor timeliness. Besides, a relatively longer vacuum time will also cause serious deformation of a refrigerator body and the like. That is, the existing refrigerators with vacuumizing structures cannot complete the vacuum freshness keeping, its requirements on the strength of the refrigerator body and the like are very large, and thus, the implementing requirements and the cost are higher.

In addition, the inventors have found that since the conventional nitrogen-generating device for air-conditioning freshness keeping is larger in size and higher in cost, the technology is basically limited to various large-scale professional storehouses (the storage capacity is generally at least 30 tons). It can be said that what type of appropriate air-conditioning technology and corresponding device may be adopted to economically miniaturize and silence the air-conditioning system to make it suitable for families or individual users is the technical problem that the technicians in the field of air-conditioning freshness keeping have been eager to solve but has not successfully solved.

SUMMARY

The present invention aims to overcome at least one of the deficiencies of the existing refrigerators by providing a refrigerating and freezing device, which creatively discharges oxygen in air in an air-conditioning freshness-keeping space from the space to obtain a nitrogen-rich oxygen-poor atmosphere favorable for freshness keeping of food in the space. In the atmosphere, the oxygen content in the space where fruits and vegetables are preserved is reduced to reduce the intensity of aerobic respiration of the fruits and vegetables. Meanwhile, a basic respiration function is ensured, thereby preventing anaerobic respiration of the fruits and vegetables, and further achieving the purpose of long-term freshness keeping of the fruits and vegetables.

For this purpose, the present invention provides a refrigerating and freezing device, comprising: a box body, having an inner container, a casing disposed outside the inner container, and a heat insulation layer located between the inner container and the casing, wherein a storage space is defined in the inner container, a storage container is disposed in the storage space, and the storage container has an air-conditioning freshness-keeping space therein; a modified atmosphere film assembly, having at least one modified atmosphere film and an oxygen-rich gas collecting chamber, wherein the surrounding space of the modified atmosphere film assembly communicates with the air-conditioning freshness-keeping space, and the modified atmosphere film assembly is configured such that more oxygen in the airflow in the surrounding space of the modified atmosphere film assembly permeates through the modified atmosphere film to enter the oxygen-rich gas collecting chamber relative to the nitrogen in the airflow in the surrounding space of the modified atmosphere film assembly; and a suction pump, disposed in the heat insulation layer between the inner container and the casing, wherein the inlet end of the suction pump communicates with the oxygen-rich gas collecting chamber via a pipeline to extract the gas permeating into the oxygen-rich gas collecting chamber to the outside of the storage container.

Optionally, the storage container is a drawer assembly, comprising a drawer cylinder, having a forward opening and disposed in the storage space; and a drawer body, slidably mounted in the drawer cylinder to be outwardly withdrawn from and inwardly inserted into the drawer cylinder operatively from the forward opening of the drawer cylinder.

Optionally, the casing comprises a back plate; and the suction pump is disposed between the rear wall of the inner container and the back plate, and is located behind the storage container Optionally, the refrigerating and freezing device further comprises a sealing box, mounted between the inner container and the casing; and a mounting frame, mounted in the sealing box via a plurality of damping cushion blocks, the suction pump being mounted on the mounting frame.

Optionally, an accommodating chamber communicating with the air-conditioning freshness-keeping space is disposed in a top wall of the drawer cylinder to accommodate the modified atmosphere film assembly.

Optionally, at least one first vent hole and at least one second vent hole spaced apart from the at least one first vent hole are formed in a wall surface between the accommodating chamber on the top wall of the drawer cylinder and the air-conditioning freshness-keeping space, to communicate the accommodating chamber with the air-conditioning freshness-keeping space at different positions. The refrigerating and freezing device further comprises a fan disposed in the accommodating chamber to promote the gas in the air-conditioning freshness-keeping space to be returned to the air-conditioning freshness-keeping space via the at least one first vent hole, the accommodating chamber, and the at least second vent hole in sequence.

Optionally, the fan is a centrifugal fan, and is located above the at least one first vent hole; an axis of rotation of the centrifugal fan is vertically downward; and an air inlet of the centrifugal fan faces the at least one first vent hole. The modified atmosphere film assembly is disposed above the at least one second vent hole, such that each of the modified atmosphere films of the modified atmosphere film assembly is parallel to the top wall.

Optionally, the centrifugal fan is disposed at the front of the accommodating chamber; and the modified atmosphere film assembly is disposed behind the centrifugal fan.

Optionally, the modified atmosphere film assembly further comprises a support frame having a first surface and a second surface parallel to each other, wherein the support frame is provided with a plurality of airflow channels extending on the first surface and the second surface respectively and penetrating the support frame to communicate the first surface and the second surface, and the plurality of airflow channels forms the oxygen-rich gas collecting chamber together; and at least one modified atmosphere film is two planar modified atmosphere films which are paved on the first surface and the second surface of the support frame respectively.

Optionally, the storage space is a refrigerating space; the box body further defines a freezing space and a temperature-changing space; the freezing space is disposed below the storage space; and the temperature-changing space is disposed between the freezing space and the refrigerating space.

The refrigerating and freezing device according to the present invention has the modified atmosphere film assembly and the suction pump, so that the nitrogen-rich oxygen-poor atmosphere favorable for food freshness keeping can be formed in the air-conditioning freshness-keeping space. In the atmosphere, the oxygen content in the space where the fruits and vegetables are preserved is reduced to reduce the intensity of the aerobic respiration of the fruits and vegetables. Meanwhile, the basic respiration function is ensured, thereby preventing anaerobic respiration of the fruits and vegetables, and further achieving the purpose of long-term freshness keeping of the fruits and vegetables.

Further, according to the refrigerating and freezing device of the present invention, since the suction pump is disposed in the heat insulation layer between the inner container and the casing, the noise during the operation of the suction pump can be significantly reduced, thereby providing a better silence experience to the user. In particular, the suction pump is located behind the storage container, and the modified atmosphere film assembly is located at the rear part of the accommodating chamber, so that the pipeline can be shortened, thereby reducing the vacuum loss in air conditioning.

Further, the refrigerating and freezing device according to the present invention not only has a good freshness-keeping effect, but also has low requirements of rigidity and strength on the storage container and the like; and the implementing requirements and the cost are low. Besides, the refrigerating and freezing device according to the present invention solves the above technical problem that the technicians in the field of air-conditioning freshness keeping have been eager to solve but has not successfully solved. The refrigerating and freezing device according to the present invention is not only small in size but also low in noise, and thus, is especially suitable for families and individuals.

Further, the refrigerating and freezing device according to the present invention is preferably a refrigerator, for example, a household compression-type direct-cooling refrigerator and a household compression-type air-cooled refrigerator, and of course, may also be a semiconductor refrigerating refrigerator.

DETAILED DESCRIPTION

Figure 1:
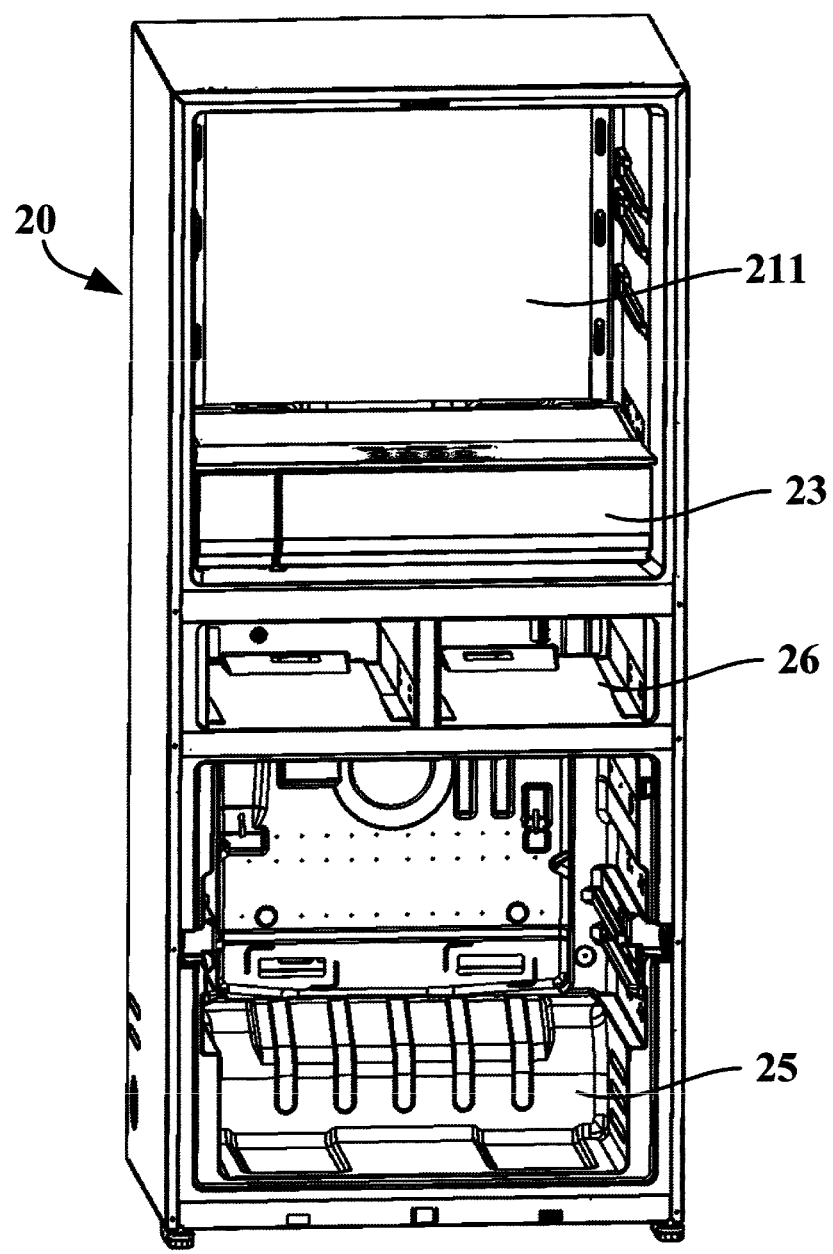
FIG. 1 is a schematic partial structural view of a refrigerating and freezing device according to an embodiment of the present invention.

The present invention will be described in detail below in conjunction with the specific embodiments shown in the drawings. However, the embodiments are not intended to limit the present invention, and the structure, method, or function changes made by those skilled in the art in accordance with the embodiments are covered in the protection scope of the present invention.

Figure 2:
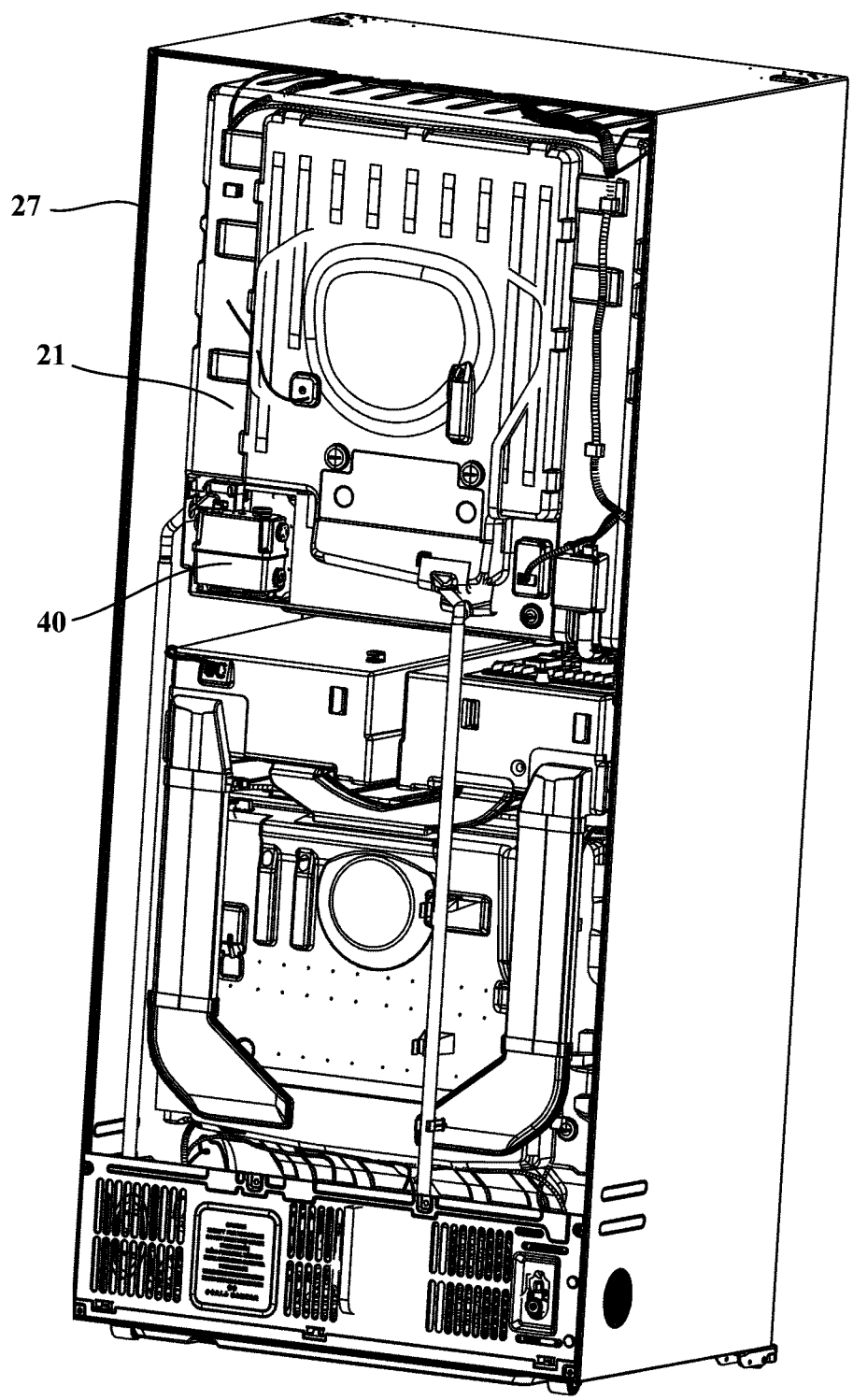
FIG. 2 is a schematic partial structural view of the structure shown in FIG. 1 from another perspective.

FIG. 1 is a schematic partial structural view of a refrigerating and freezing apparatus according to an embodiment of the present invention. FIG. 2 is a schematic partial structural view of the structure shown in FIG. 1 from another perspective. As shown in FIG. 1 and FIG. 2, the embodiment of the present invention provides the refrigerating and freezing device, which may comprise a box body 20, a main door body, a modified atmosphere film assembly 30, a suction pump 41, and a refrigerating system.

The box body 20 comprises an inner container 21, a casing 27 disposed outside the inner container 21, and a heat insulation layer between the inner container 21 and the casing 27. A storage space 211 is defined in the inner container 21. The main door body can be formed by two opposite door bodies; and the two opposite door bodies can be rotatably mounted to the box body 20, and configured to open or close the storage space 211 defined by the box body 20. The main door body can also be one door body. Further, a storage container is disposed in the storage space 211; and the storage container has an air-conditioning freshness-keeping space therein. The air-conditioning freshness-keeping space can be a closed space or an approximately closed space. Preferably, the storage container is a drawer assembly. The storage container may comprise a drawer cylinder 22 and a drawer body 23. The drawer cylinder 22 can have a forward opening and be disposed in the storage space 211, and can be disposed at the lower part of the storage space 211 specifically. As can be appreciated by those skilled in the art, the drawer cylinder 22 can also be disposed in the middle or upper part of the storage space 211. The drawer body 23 is slidably disposed in the drawer cylinder 22 to be operatively withdrawn from and inwardly inserted into the drawer cylinder 22 from the forward opening of the drawer cylinder 22. The drawer body 23 can have a drawer end cover which can cooperate with the opening of the drawer cylinder 22, so as to seal the air-conditioning freshness-keeping space. In some optional embodiments, the storage container may comprise a cylinder and a small door body configured to open or close the cylinder.

The refrigerating system is configured to provide cold to the storage space 21. Specifically, in some embodiments, the refrigerating system can be a refrigerating cycle system formed by a compressor, a condenser, a throttling device, an evaporator and the like. The evaporator is configured to provide the cold to the storage space 211 directly or indirectly. For example, when the refrigerating and freezing device is a household compression-type direct-cooling refrigerator; and the evaporator may be disposed outside or inside the rear wall surface of the inner container 21. When the refrigerating and freezing device is a household compression-type air-cooled refrigerator, the box body 20 further has an evaporator chamber therein; and the evaporator chamber communicates with the storage space 211 by an air passage system. The evaporator is disposed in the evaporator chamber, and a fan is arranged at the outlet to perform cycle refrigeration on the storage space 211. In other embodiments, the refrigerating system may also be a semiconductor refrigerating device.

The modified atmosphere film assembly 30 has at least one modified atmosphere film 31 and an oxygen-rich gas collecting chamber. The surrounding space of the modified atmosphere film assembly 30 communicates with the air-conditioning freshness-keeping space. The modified atmosphere film assembly 30 is configured such that more oxygen in the airflow in the surrounding space of the modified atmosphere film assembly 30 permeates through the modified atmosphere film 31 to enter the oxygen-rich gas collecting chamber relative to the nitrogen in the airflow in the surrounding space of the modified atmosphere film assembly 30. Specifically, the inner side surface of each modified atmosphere film 31 faces the oxygen-rich gas collecting chamber, so that when the pressure of the oxygen-rich gas collecting chamber is lower than the pressure of the surrounding space of the modified atmosphere film assembly 30, more oxygen in the air in the outer space of the modified atmosphere film assembly 30 permeates through the at least one modified atmosphere film 31 to enter the oxygen-rich gas collecting chamber relative to the nitrogen in the air.

The suction pump 41 may be disposed in the heat insulation layer between the inner container 21 and the casing 27, wherein the inlet end of the suction pump 41 communicates with the oxygen-rich gas collecting chamber of the modified atmosphere film assembly 30 via a pipeline to extract the gas permeating into the oxygen-rich gas collecting chamber to the outside of the storage container. The gas exhaust pipeline connected to the outlet of the suction pump 41 may penetrate the heat insulation layer to extend into an evaporating dish which may also be called a water receiving tray.

In the present embodiment, the suction pump 41 extracts the gas outwardly, so that the pressure of the oxygen-rich gas collecting chamber is lower than the pressure of the surrounding space of the modified atmosphere film assembly 30. Further, the oxygen in the surrounding space of the modified atmosphere film assembly 30 is enabled to enter the oxygen-rich gas collecting chamber. Since the air-conditioning freshness-keeping space communicates with the surrounding space of the modified atmosphere film assembly 30, the air in the air-conditioning freshness-keeping space will enter the surrounding space of the modified atmosphere film assembly 30. Therefore, the oxygen in the air in the air-conditioning freshness-keeping space is also enabled to enter the oxygen-rich gas collecting chamber, thereby obtaining the nitrogen-rich oxygen-poor atmosphere favorable for food freshness keeping in the air-conditioning freshness-keeping space.

According to the refrigerating and freezing device of the present invention, the nitrogen-rich oxygen-poor atmosphere favorable for food freshness keeping can be formed in the air-conditioning freshness-keeping space. In the atmosphere, the oxygen content in the space where the fruits and vegetables are preserved is reduced to reduce the intensity of aerobic respiration of the fruits and vegetables. Meanwhile, a basic respiration function is ensured, thereby preventing anaerobic respiration of the fruits and vegetables, and further achieving the purpose of long-term freshness keeping of the fruits and vegetables. Moreover, the atmosphere also has a large amount of gases such as nitrogen gas, so that the cooling efficiency of an article in the air-conditioning freshness-keeping space is not reduced, thereby effectively storing the fruits and vegetables. In addition, the requirements of rigidity and strength on the box body 20 and the like are lower, and the implementing requirements and the cost are very low. The refrigerating and freezing device according to the present invention solves the above technical problem that the technicians in the field of air-conditioning freshness keeping have been eager to solve but has not successfully solved. The refrigerating and freezing device according to the present invention is not only small in size but also low in noise, and is especially suitable for families and individuals. The suction pump 41 is disposed in the heat insulation layer to significantly reduce the noise during operation of the suction pump, thereby providing a better silence experience to the user.

In some embodiments of the present invention, a plurality of micropores may be formed in the drawer cylinder 22, and the storage space 211 communicates with the air-conditioning freshness-keeping space via the plurality of micropores which may be air pressure balancing holes. Each of the micropores may be a millimeter-level micropore. For example, each of the micropores has a diameter of 0.1 mm to 3 mm, preferably 1 mm, 1.5 mm, or the like. With the plurality of micropores, the pressure in the air-conditioning freshness-keeping space is not too low. Due to the plurality of micropores, the nitrogen in the air-conditioning freshness-keeping space will not flow to the large storage space 211; even if the nitrogen flows, the flow is very small or even negligible, which will not adversely affect the freshness keeping of food in the air-conditioning freshness-keeping space. In some optional embodiments of the present invention, the micropores may not be disposed in the drawer cylinder 22. Even so, a large amount of gases such as nitrogen still exists in the air-conditioning freshness-keeping space. The user can open the drawer body 23 without too much effort, and a lot of effort will be saved compared to the existing vacuum storage room.

In some embodiments of the present invention, the inner container 21 may be a refrigerating chamber liner. The storage space 211 is a refrigerating space, and the storage temperature thereof ranges from 2° C. to 10° C., preferably between 3° C. and 8° C. Further, the box body 20 may also define a freezing space 25 and a temperature-changing space 26. That is, the box body 20 may further comprise a freezing chamber liner and a temperature-changing chamber liner. The freezing space 25 is disposed below the storage space 211, and the temperature-changing space 26 is disposed between the freezing space and the refrigerating space. The temperature range in the freezing space is generally −14° C. to −22° C. The temperature-changing space can be adjusted as needed to store appropriate food. In some optional embodiments of the present invention, the storage space 211 may also be the freezing space or the temperature-changing space. That is, the temperature range of the storage space 211 may be controlled at −14° C. to −22° C. or adjusted as needed. Further, the relative positions of the refrigerating space, the freezing space, and the temperature-changing space may be adjusted according to actual needs.

In some embodiments of the present invention, the casing 27 may comprise a back plate. The suction pump 41 is disposed between the back wall of the inner container 21 and the back plate and is located behind the storage container, so as to reduce the length of the pipeline between the suction pump 41 and the modified atmosphere film assembly 30, thereby reducing the vacuum loss in air conditioning.

Figure 3:
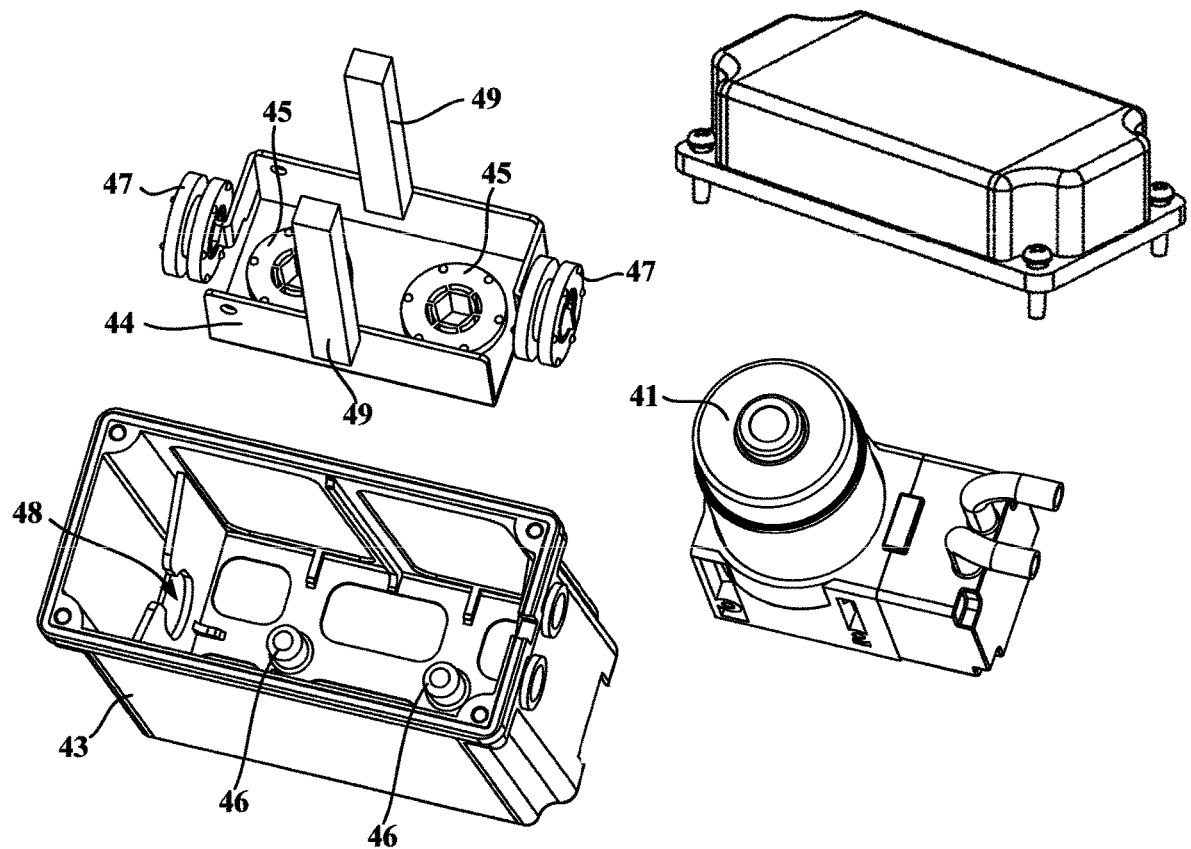
FIG. 3 is a schematic exploded view of a suction pump assembly in a refrigerating and freezing device according to an embodiment of the present invention.

FIG. 3 is a schematic exploded view of a suction pump assembly 40 in a refrigerating and freezing device according to an embodiment of the present invention. Further, in order to reduce the noise, as shown in FIG. 3, in some embodiments of the present invention, the refrigerating and freezing device may further comprise a sealing box 43 and a mounting frame 44. The mounting frame 44 and the inner wall of the sealing box 43 are connected by a plurality of damping cushion blocks. The suction pump 41 is fixed inside the mounting frame 44, so as to reduce the vibration and noise during operation of the suction pump 41. Specifically, the bottom of the mounting frame 44 is provided with two damping cushion blocks 45; and the damping cushion blocks 45 sleeve positioning posts 46 on the bottom surface of the sealing box 43. One circular damping cushion block 47 is disposed on each of the two opposite sides of the mounting frame 44, and is clamped in a corresponding clamping groove 48 of the sealing box 43. One damping cushion block 49 is fixed on each of the other two opposite sides of the mounting frame 44. The suction pump 41 may be placed among the various damping cushion blocks in the sealing box 43 and fastened to the mounting frame by screws. Further, the heat insulation layer is further internally provided with a pump component mounting chamber partitioned by a partition plate, the rear wall of the inner container 21 and the like; and the sealing box 43 may be disposed in the pump component mounting chamber by a damping component.

Figure 4:
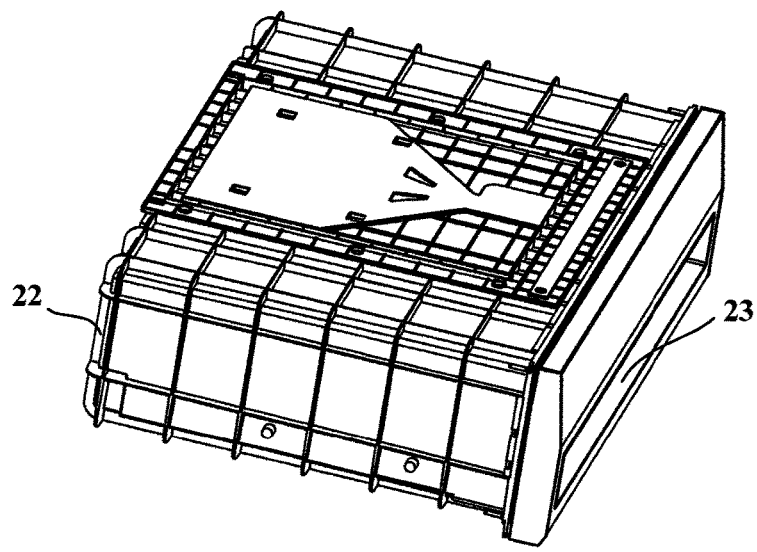
FIG. 4 is a schematic partial structural view of a refrigerating and freezing device according to an embodiment of the present invention.
Figure 5:
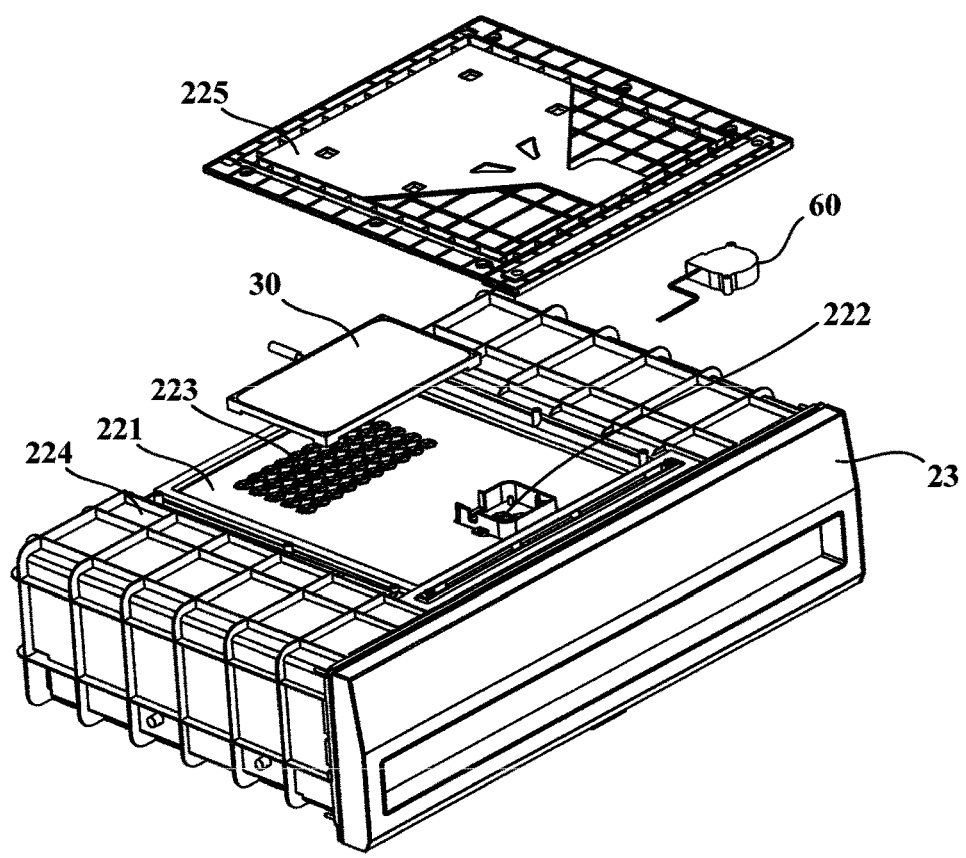
FIG. 5 is a schematic exploded view of the structure shown in FIG. 4.

In some embodiments of the present invention, as shown in FIG. 4 and FIG. 5, the modified atmosphere film assembly 30 may be disposed on the cylinder wall of the drawer cylinder 22. Further, the modified atmosphere film assembly 30 may be in the form of a flat plate, and preferably disposed on the top wall of the drawer cylinder 22 horizontally. Specifically, an accommodating chamber 221 is disposed in the top wall of the drawer cylinder 22 to accommodate the modified atmosphere film assembly 30. For example, at least one first vent hole 222 and a second vent hole 223 are formed in a wall surface between the accommodating chamber of the top wall of the drawer cylinder 22 and the air-conditioning freshness-keeping space. The at least one first vent hole 222 is spaced apart from the at least one second vent hole 223, so as to communicate the accommodating chamber with the air-conditioning freshness-keeping space at different positions. There may be multiple first vent holes 222 and the second vent holes 223 which are small holes. In some optional embodiments, the inner side of the top wall of the drawer cylinder 22 has a sunken groove. The modified atmosphere film assembly 30 is disposed in the sunken groove of the top wall of the drawer cylinder 22.

In some embodiments of the present invention, in order to promote the flow of the gas between the air-conditioning freshness-keeping space and the accommodating chamber 22, the refrigerating and freezing device may further comprise a fan 60, which may be disposed in the accommodating chamber. The fan is configured to promote the gas in the air-conditioning freshness-keeping space to enter the accommodating chamber 221 via the first vent hole 222, and cause the gas in the accommodating chamber 221 to enter the air-conditioning freshness-keeping space via the second vent hole 223. That is, the fan 60 can promote the gas in the air-conditioning freshness-keeping space to be returned to the air-conditioning freshness-keeping space via the at least one first vent hole 222, the accommodating chamber, and the at least one second vent hole 223 in sequence.

The fan 60 is preferably a centrifugal fan and disposed at the first vent hole 222 of the accommodating chamber 221. That is, the centrifugal fan is located above the at least one first vent hole 222, and has an axis of rotation vertically downward and an air inlet opening directly facing the first vent hole 222. The air outlet of the centrifugal fan may face the modified atmosphere film assembly 30. The modified atmosphere film assembly 30 is disposed above the at least one second vent hole 223, such that each modified atmosphere film of the modified atmosphere film assembly 30 is parallel to the top wall of the drawer cylinder 22. The at least one first vent hole 222 is disposed in the front part of the top wall, and the at least one second vent hole 223 is disposed in the rear part of the top wall. That is, the centrifugal fan is disposed at the front part of the accommodating chamber 221, the modified atmosphere film assembly 30 is disposed at the rear part of the accommodating chamber 22, and the modified atmosphere film assembly 30 is disposed behind the centrifugal fan. Further, the top wall of the drawer cylinder 22 comprises a main plate portion 224 and a cover plate portion 225. A sunken portion is formed in a local region of the main plate portion 224. The cover plate portion 26 is detachably disposed on the recessed portion in a covering manner, so as to form the accommodating chamber 221. In order to facilitate the manufacture of the drawer cylinder 22, the main plate portion 224 may be integrally formed with the side wall, the bottom wall, and the rear wall of the drawer cylinder 22.

Figure 6:
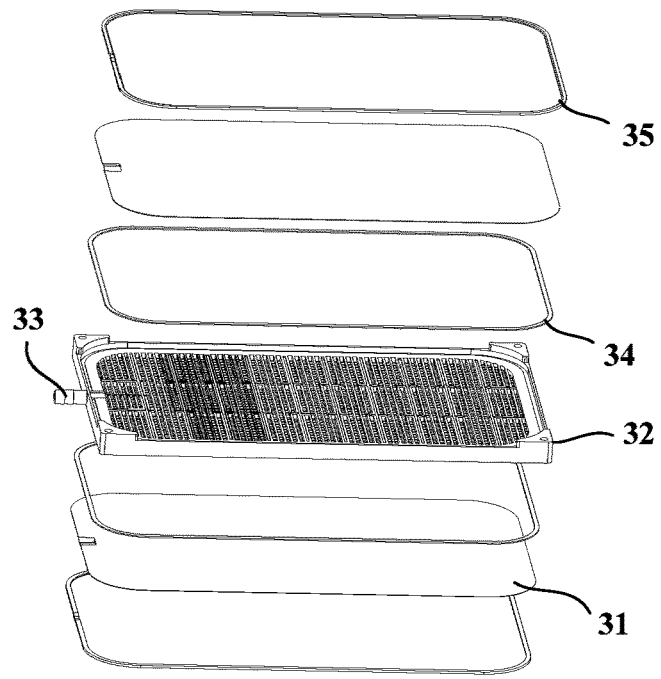
FIG. 6 is an exploded view of a modified atmosphere film assembly in a refrigerating and freezing device according to one embodiment of the present invention.

In some embodiments of the present invention, as shown in FIG. 6, the modified atmosphere film assembly 30 can be in the shape of a flat plate, the modified atmosphere film assembly 30 can also comprise a support frame 32. The modified atmosphere film 31 is an oxygen-enriching membrane preferably and two modified atmosphere films 31 can be disposed and mounted on both sides of the support frame 32, so that the two modified atmosphere films 31 and the support frame 32 define the oxygen-rich gas collecting chamber together. Further, the support frame 32 may comprise a side frame; and structures such as rib plates and/or flat plates and other structures are disposed in the frame. Airflow channels may be formed between the rib plates and between the rib plates and the flat plates, and the surfaces of the rib plates and the surfaces of the flat plates may be provided with grooves for forming the airflow channels. The rib plates and/or the flat plates can increase the structural strength and the like of the modified atmosphere film assembly 30. That is, the support frame 32 has a first surface and a second surface parallel to each other. The support frame 32 is provided with the plurality of airflow channels extending on the first surface and the second surface respectively, and penetrating the support frame 32 to communicate the first surface and the second surface. The plurality of airflow channels forms the oxygen-rich gas collecting chamber together. The at least one modified atmosphere film 31 is two planar modified atmosphere films which are paved on the first surface and the second surface of the support frame 32 respectively.

In some embodiments of the present invention, the support frame 32 comprises an air extracting hole 33 communicating with the at least one airflow channel and disposed in the side frame, so that the oxygen in the oxygen-rich gas collecting chamber is allowed to be output. The air extracting hole 33 communicates with the suction pump 41. Specifically, the air extracting hole 33 may be disposed in the long side of the side frame or in the short side of the frame, which is determined according to the set orientation of the modified atmosphere film assembly 30 or actual design requirements. For example, in the embodiment shown in FIG. 4 and FIG. 5, the air extracting hole 33 may be disposed in the long side of the side frame. The modified atmosphere film 31 is firstly mounted on the side frame by a double-sided tape 34, and then sealed by a sealant 35.

In some embodiments, the support frame 32 may comprise a side frame, a plurality of first rib plates, and a plurality of second rib plates. The above plurality of first rib plates is longitudinally disposed inside the side frame at an interval and transversely extends; and one side surfaces of the plurality of first rib plates form a first surface. The plurality of second rib plates is transversely disposed at an interval and longitudinally extends on the other side surface of the plurality of first rib plates, and one side surfaces of the above plurality of second rib plates away from the first rib plates form a second surface. In the support frame 32 according to the present invention, the plurality of first rib plates longitudinally disposed at an interval and transversely extending and the plurality of second rib plates transversely disposed at an interval on one side surface of the plurality of first rib plates and longitudinally extending are disposed inside the frame, so that the continuity of the airflow channels is ensured on one hand, the size of the support frame 32 is greatly reduced on the other hand, and the strength of the support frame 32 is greatly enhanced. In addition, the above structure of the support frame 32 ensures that the modified atmosphere film 31 can obtain sufficient support, and can maintain better flatness all the time even when the negative pressure inside the oxygen-rich gas collecting chamber is relatively higher. Thus, the long service life of the modified atmosphere film assembly 30 is ensured.

In a further embodiment, the plurality of first rib plates may comprise a plurality of first narrow rib plates and a plurality of first wide rib plates. The plurality of first wide rib plates is disposed at an interval, and the plurality of first narrow rib plates is disposed between every two adjacent first wide rib plates. The above plurality of second rib plates may comprise a plurality of second narrow rib plates and a plurality of second wide rib plates. The plurality of second wide rib plates is disposed at an interval, and the plurality of the second narrow rib plates is disposed between every two adjacent second wide rib plates. Those skilled in the art will readily understand that "wide" and "narrow" herein are relative.

In some embodiments, each first wide rib plate is sunk inwardly from a side surface thereof on which the first surface is formed to form a first trench. Each second wide rib plate is sunk inwardly from a side surface thereof on which the second surface is formed to form a second trench, thereby improving the communication of the internal grid structure under the premise of ensuring that the thickness of the support frame 32 is very small (or the size is very small).

In a further embodiment, a partial surface of each first wide rib plate deviated away from the first surface extends toward the second rib plate to be flush with the second surface. The first wide rib plate is sunk inwardly from the partial surface which is flush with the second surface to form a third trench. The intersecting parts the third trench and the second trench are communicated to form a cross trench. A partial surface of the at least one of the plurality of second wide rib plates deviated away from the second surface extends toward the first rib plate to be flush with the first surface. At least one of the plurality of second wide rib plates is inwardly sunk from and the partial surface which is flush with the first surface to form a fourth trench. The intersecting parts of the fourth trench and the first trench are communicated to form a cross groove.

In some embodiments of the present invention, in order to facilitate the flow of the airflow, the inner surface of the cover plate portion 225 may extend downwardly to form a plurality of air guiding rib plates, so as to guide the airflow from the fan 60 to flow through the outside surface of each modified atmosphere film 31 of the modified atmosphere film assembly 30 deviated away from the oxygen-rich gas collecting chamber in the accommodating chamber. The plurality of air guiding rib plates may be divided into two groups, comprising a first group of air guiding rib plates and a second group of air guiding rib plates which are symmetrically disposed with the first group of air guiding rib plates about a plane. Each group of air guiding rib plates comprises a first air guiding rib plate, at least one second air guiding rib plate, and at least one third air guiding rib plate. The first air guiding rib extends from the air outlet of the centrifugal fan to one side of the accommodating chamber and extends to a transverse outer side of the modified atmosphere film assembly 30. Each second air guiding rib plate is disposed between the two first air guiding rib plates and between the modified atmosphere film assembly 30 and the centrifugal fan. Each third air guiding rib plate is located on a transverse outer side of the modified atmosphere film assembly 30. Thus, the airflow is guided to enter the gap between the modified atmosphere film assembly 30 and the bottom or top surface of the accommodating chamber from two transverse sides of the modified atmosphere film assembly 30.

In some embodiments of the present invention, a locking device, a handle and a handle positioning device are disposed between the drawer body 23 and the drawer cylinder 22. The locking device comprises pivoting lock catches disposed on both sides of the end cover of the drawer, two buckling portions disposed on the drawer cylinder 22, and a fastening promoting device. Each buckling portion may be a protrusion. The fastening promoting device may be configured to promote the two pivoting lock catches to rotate in the directions (i.e., their respective first directions) to be engaged with their respective buckling portions. The handle extends horizontally and may be slidably mounted to the end cover of the drawer in a vertical direction. Moreover, when the drawer body 23 is in the closed state, the position of the handle may be the initial position of the handle. The handle is configured such that both ends thereof are in contact with and abut against the two pivoting lock catches respectively when in the initial position, to prevent each pivoting lock catch from rotating in the other direction opposite to the corresponding first direction. Thus, the pivoting lock catches are engaged with the buckling portions to lock the drawer body 23 in the drawer cylinder 22. Further, each pivoting lock catch is allowed to rotate in the direction opposite to the corresponding first direction when the handle is moved vertically to the locking releasing position, i.e., from the initial position to the locking releasing position. The pivoting lock catches are allowed to rotate to be disengaged from the corresponding buckling portions when the drawer body 23 is pulled outwardly, thereby opening the drawer body 23. The handle positioning device is configured to hold the handle in the predetermined position after the handle is moved to each predetermined position, primarily comprising the initial position and the locking releasing position. When the drawer body is required to be opened, the user firstly moves the handle vertically to enable the handle to reach the locking releasing position, the handle positioning device holds the handle in such position, and then the user pulls the drawer body 23 outwardly. When the drawer body is required to be closed, the user firstly closes the drawer body 23 and then returns the handle to the initial position by moving it vertically, and the handle positioning device holds the handle in such position, thereby holding the drawer body 23 and the drawer cylinder 22 in a locked state.

In order to further smooth the movement of the handle, the two ends of the handle are respectively provided with a guiding rod and a sliding block; and the guiding rod extends in the vertical direction. The drawer body 23 further comprises two groups of slideways; and each group of the slideways at least has three chutes extending in the vertical direction, so that two chutes are located at the both sides of the guide bar respectively, and the sliding block moves on the remaining chute; or two chutes are located at the both sides of the sliding block respectively, and the guiding rod moves on the remaining chute. For example, each group of the slideways may comprise four chutes, wherein two chutes are located at the front and rear sides of the guiding rod respectively, and two chutes are located at the transverse two sides (i.e., the left and right sides) of the sliding block respectively.

The detailed description set forth above is merely illustrative of the feasible embodiments of the present invention, and is not intended to limit the protection scope of the present invention. The equivalent embodiments or modifications made without departing from the spirit of the present invention are intended to be covered within the scope of the present invention.

What is claimed is:

1. A refrigerating and freezing device, comprising:
    a box body having an inner container, a casing disposed outside the inner container and a heat insulation layer located between the inner container and the casing, wherein a storage space is defined in the inner container, a storage container is disposed in the storage space, and the storage container has an air-conditioning freshness-keeping space therein;
    a modified atmosphere film assembly having at least one modified atmosphere film and an oxygen-rich gas collecting chamber, wherein a surrounding space of the modified atmosphere film assembly is communicates with the air-conditioning freshness-keeping space, and the modified atmosphere film assembly is configured such that more oxygen in the airflow in the surrounding space of the modified atmosphere film assembly permeates through the modified atmosphere film to enter the oxygen-rich gas collecting chamber relative to the nitrogen in the airflow in the surrounding space of the modified atmosphere film assembly; and
    a suction pump disposed in the heat insulation layer between the inner container and the casing, wherein the inlet end of the suction pump is communicated with the oxygen-rich gas collecting chamber via a pipeline to extract the gas permeating into the oxygen-rich gas collecting chamber to the outside of the storage container;
    wherein the storage container is a drawer assembly and comprises:
        a drawer cylinder having a forward opening and disposed in the storage space; and
        a drawer body slidably mounted in the drawer cylinder, to be outwardly withdrawn from and inwardly inserted into the drawer cylinder operatively from the forward opening of the drawer cylinder;
    an accommodating chamber communicating with the air-conditioning freshness-keeping space is disposed in a top wall of the drawer cylinder to accommodate the modified atmosphere film assembly;
    at least one first vent hole and at least one second vent hole spaced apart from the at least one first vent hole are formed in a wall surface between the accommodating chamber of the top wall of the drawer cylinder and the air-conditioning freshness-keeping space to communicate the accommodating chamber with the air-conditioning freshness-keeping space at different positions; and the refrigerating and freezing device further comprises a fan disposed in the accommodating chamber to promote the gas in the air-conditioning freshness-keeping space to be returned to the air-conditioning freshness-keeping space via the at least one first vent hole, the accommodating chamber, and the at least second vent hole in sequence;
    the fan is a centrifugal fan, and is located above the at least one first vent hole, an axis of rotation of the centrifugal fan is vertically downward, and an air inlet of the centrifugal fan faces the at least one first vent hole; and the modified atmosphere film assembly is disposed above the at least one second vent hole, such that each of the modified atmosphere films of the modified atmosphere film assembly is parallel to the top wall.

2. The refrigerating and freezing device according to claim 1, wherein the casing comprises a back plate, and the suction pump is disposed between the rear wall of the inner container and the back plate, and is located behind the storage container.

3. The refrigerating and freezing device according to claim 1, further comprising:
    a sealing box mounted between the inner container and the casing; and
    a mounting frame mounted in the sealing box via a plurality of damping cushion blocks, wherein the suction pump is mounted on the mounting frame.

4. The refrigerating and freezing device according to claim 1, wherein the centrifugal fan is disposed at the front of the accommodating chamber, and the modified atmosphere film assembly is disposed behind the centrifugal fan.

5. The refrigerating and freezing device according to claim 1, wherein the modified atmosphere film assembly further comprises a support frame having a first surface and a second surface parallel to each other, the support frame is provided with a plurality of airflow channels extending on the first surface and the second surface respectively and penetrating the support frame to communicate the first surface with the second surface, and the plurality of airflow channels forms the oxygen-rich gas collecting chamber together; and at least one modified atmosphere film is two planar modified atmosphere films which are paved on the first surface and the second surface of the support frame respectively.

6. The refrigerating and freezing device according to claim 1, wherein the storage space is a refrigerating space; the box body further defines a freezing space and a temperature-changing space, the freezing space is disposed below the storage space, and the temperature-changing space is disposed between the freezing space and the refrigerating space.

* * * * *